(12) United States Patent
Gilbert

(10) Patent No.: US 7,453,167 B2
(45) Date of Patent: Nov. 18, 2008

(54) SOLAR WINDMILL

(76) Inventor: Micah Gilbert, 5213 Scottish Way, Plano, TX (US) 75093

( * ) Notice: Subject to any disclaimer, the term of this patent is extended or adjusted under 35 U.S.C. 154(b) by 142 days.

(21) Appl. No.: 11/458,653

(22) Filed: Jul. 19, 2006

(65) Prior Publication Data

US 2008/0047270 A1 Feb. 28, 2008

(51) Int. Cl.
*F03D 11/00* (2006.01)
(52) U.S. Cl. ........................................ 290/55
(58) Field of Classification Search ............ 290/55
See application file for complete search history.

(56) References Cited

U.S. PATENT DOCUMENTS 5,075,564 A * 12/1991 Hickey ................... 290/55
5,254,876 A * 10/1993 Hickey ................... 290/55
7,045,702 B2 * 5/2006 Kashyap ................. 136/244
7,172,386 B2 * 2/2007 Truong et al. ............ 415/4.1
2005/0230978 A1 * 10/2005 McGovern ............... 290/44

FOREIGN PATENT DOCUMENTS

| DE | 10212354 A1 | * | 10/2003 |
|---|---|---|---|
| FR | 2535406 A | * | 5/1984 |
| JP | 06167269 A | * | 6/1994 |
| JP | 10288142 A | * | 10/1998 |
| JP | 11125171 A | * | 5/1999 |
| JP | 2001073926 A | * | 3/2001 |
| JP | 2006105107 A | * | 4/2006 |
| WO | WO 2006015850 A2 | * | 2/2006 |

* cited by examiner

*Primary Examiner*—Joseph Waks
(74) *Attorney, Agent, or Firm*—Howison & Arnott, L.L.P.

(57) ABSTRACT

An environmentally friendly combination wind turbine and solar energy collector is provided. Solar panels are mounted on the surfaces of a wind turbine such that the combined energy from the wind turbine and the solar panels are provided as an output.

16 Claims, 3 Drawing Sheets

SOLAR WINDMILL

BACKGROUND OF THE INVENTION

1. Description of Related Art

The present invention relates generally to the field of electrical energy generation. More specifically, the present invention relates to generating electrical energy by converting both solar energy and wind energy into electrical energy on a single device.

Organic fuel resources, such as oil, gas and coal, are being depleted at an alarming rate. Such organic fuels, when burned, produce pollutants such as carbon dioxide, carbon monoxide, sulfur, and soot. These pollutants are blamed for causing unwanted changes to the earth's environment.

Nuclear energy, with its promise of being a clean and efficient energy source, has reminded the human race of how dangerous it can be if not closely monitored. The Three Mile Island and Chernobyl nuclear power plant incidents both have prominent negative places in history books. Furthermore, disposal of nuclear waste, which remains radioactive for thousands of years, produces long term nuclear energy related problems that cannot be ignored.

Thus, there remains a need for an abundant, readily available energy resource that is, virtually inexhaustible, and clean. Being clean should mean that there are few, if any, harmful by-products produced during the construction of the energy conversion device or as a result of converting an energy source into useable energy.

Solar energy has been proclaimed by some as one of best sources for our future energy needs. Solar energy has been dubbed a clean energy source because the manufacture of solar panels produces a minimum of dangerous by-products and the conversion of solar energy to electricity does not produce any significant dangerous by-products.

Yet, there are a few deficiencies with the present day conversion of solar energy into electrical energy. For example, structures that receive solar energy, in order to maximize efficiency, must follow or track the sun as it crosses the daytime sky. These sun tracking structures are expensive to design and build. Furthermore, solar panels only convert solar energy during sunny daylight hours. Solar panels do not produce any significant amount of energy during cloudy days or during nighttime hours. Additionally, solar panels become inefficient as the sun heats them. It is necessary to cool the solar panels to keep their efficiency maximized. There are methods of cooling solar panels that use water or other cooling liquids, but such methods are costly to design into solar conversion devices that move to track the sun.

Wind energy has also been proclaimed as another one of best energy sources for our future energy needs. Wind turbines convert wind energy into electrical or mechanical energy and are both clean to manufacture and use. Wind turbine farms are popping up in many regions of the world and are beginning to produce energy on a fairly large scale.

Presently, there are a couple of popular types of wind turbines that are used to produce electrical energy. First there is a three-bladed wind turbine that looks like a very large propeller mounted on a high pole. These three-bladed wind turbines are operated "upwind" such that the blades face into the wind and spin about a horizontal axis. This type of wind turbine basically works opposite to the workings of a cooling fan. Instead of using electricity to make wind, this type of wind turbine uses wind to make electricity. The wind turns the blades, which spin a shaft. The shaft connects to a generator and electricity is produced.

Another popular type of wind turbine that is used today is the "lollipop" style wind turbine wherein the blades are mounted on a vertical axis. The blades are forced to spin by the wind regardless of the wind direction, but its efficiency is diminished due to the blades having to spin both into and with the wind.

Both of the afore mentioned wind turbines have drawbacks. The three bladed horizontal-axis wind turbine's efficiency depends on the wind's direction unless the whole of the wind turbine is designed to rotate vertically and point itself into the wind. The lollipop wind turbine's efficiency may be diminished due to the blades having to spin a half revolution with the wind and the other half revolution into the wind. Both types of wind turbines are not bird friendly because birds cannot see or dodge the thin, quickly rotating blades. And of course, both types of wind turbines produce little or no energy on light-breezy or calm days.

What is needed is a clean mechanism for producing energy that converts energy from one or more virtually unlimited energy resources and will continue to convert energy regardless of whether the weather is sunny, cloudy, windy, or calm.

SUMMARY OF THE INVENTION

Embodiments of the present invention provide a solar and wind powered electricity generating device that uses both of the virtually unlimited sources of solar energy and wind energy top produce electricity regardless of whether the weather is sunny and calm or windy and cloudy.

In one embodiment of the invention a solar wind turbine is provided. The exemplary embodiment comprises an outer support structure that has a top, a bottom and at least one support rod or beam extending from the top to the bottom of the support structure. A solar panel is attached to the top surface of the support structure's top. A turbine body is rotably mounted such that it spins on an axis that extends from the top to the bottom of the support structure. The turbine body includes a plurality of turbine blades that extend in a general radial direction from the axis. The turbine blades are equally spaced circumferentially about the axis as well. This embodiment also includes additional solar panels that are mounted on at least one surface of each of the turbine blades.

Other embodiments of the invention provide a solar wind turbine that has an outer support structure. The outer support structure comprises a base portion at the bottom of the support structure, a top panel on the top of the support structure, and a plurality of support members attached to and spaced about a perimeter of the base. The support members extend from the base portion to the top panel and attach thereto. A flap is movably attached to and extends radially from one of the support members. The flap is positioned to direct air flow into an interior portion of the outer support structure. Within the outer support structure is a turbine body that has fins thereon. The turbine body fins each have a first fin width portion that extends radially from a vertical axis, which extends from said base portion to said top panel. Each turbine body fin also has a second fin width portion that extends at a predetermined angle from the first fin width portion. Each fin further comprises a height that is less than a distance between said top panel and said base portion. The turbine body is rotably mounted so that the turbine body fins each rotate about the vertical axis. A solar panel is mounted on a top surface of the top panel. Another solar panel is mounted on a surface of the flap. Furthermore, additional solar panels are mounted on each of the turbine body fins.

Using a solar wind turbine configured in accordance with an embodiment of the invention, electrical energy will be produced from virtually unlimited energy sources in an environmentally clean manner. Embodiments of the invention are considered bird friendly because birds can see and avoid the turbine fins with injury. Furthermore, embodiments of the invention produce electrical energy from solar and wind energy sources without concern for the position of the sun or wind direction. Furthermore, the invention provides embodiments with other features and advantages in addition to or in lieu of those discussed above. Many of these features and advantages are apparent from the description below with reference to the following drawings.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF EXEMPLARY EMBODIMENTS

The numerous innovative teachings of the present application will be described with particular reference to exemplary embodiments. However, it is understood that these embodiments provide only a few examples of the many advantageous uses of the innovative teachings herein. In general, statements made in the specification do not necessarily delimit any of the various claimed inventions. Moreover, some statements may apply to some inventive features, but not to others.

Figure 1:
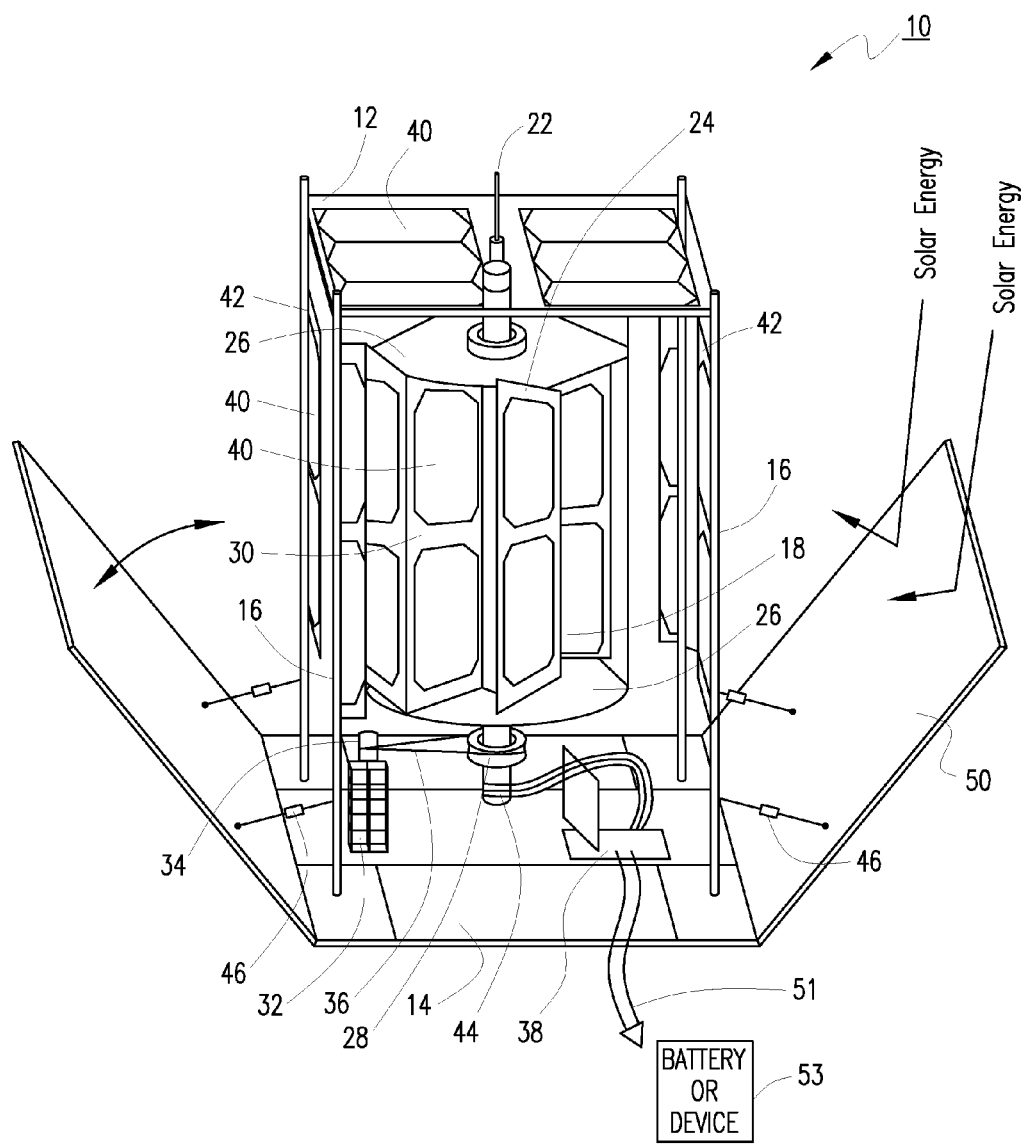
FIG. 1 is a drawing of a solar windmill in accordance with an embodiment of the present invention.

FIG. 1 illustrates an exemplary solar windmill or solar wind turbine 10. The exemplary solar windmill 10 has an outer support structure. The outer support structure includes a top 12 and a bottom 14. The top 12 and bottom 14 are shown as being generally planar, but alternate embodiments may have a dome, a pyramid or other non-planar structure. Supporting the top 12 and bottom 14 of the outer support structure are a plurality of support rods 16. There are four support rods shown, but one of ordinary skill in the art may determine that three to eight rods may be necessary. Furthermore, the rods 16 may be L-beam or I-beam shaped rods in order to provide additional support and stability to the structure without adding too much additional manufacturing or raw material costs.

Figure 3:
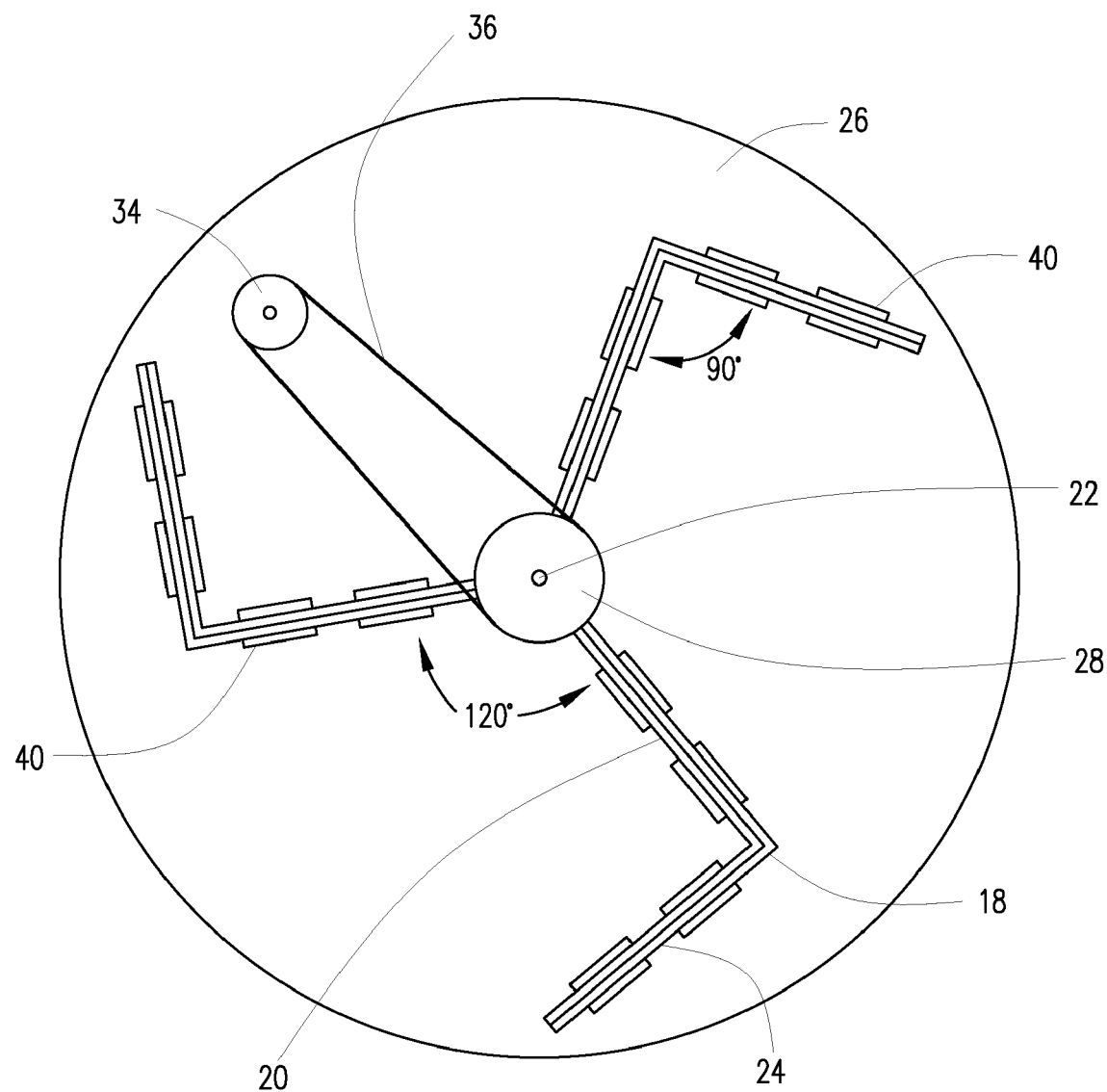
FIG. 3 is a top view of blades of a solar-windmill in accordance with an embodiment of the present invention.

The horizontal sides of the support structure are open to allow both wind and light to enter into the interior of the support structure. Wind, not specifically shown, may enter the support structure laterally and apply force against the centrally located turbine blades 18. The exemplary solar windmill 10 shown has three turbine blades 18. Each turbine blade 18 includes two planar surfaces. The first of the planar surfaces is referred to as a blade portion 20, which extends radially from a central axis 22 that extends vertically within the support structure. The second planar surface is called a prong 24. Each prong 24 extends outward from the blade portion at an angle. In the exemplary solar windmill 10 the angle between the blade 20 and the prong 24 is 90 degrees (See FIG. 3), but the angle can range from about 10 degrees to about 170 degrees.

Exemplary turbine blades are made out of a polyacrylate plastic, but substantially any light weight, sturdy material that will not degrade in sunlight will work well. It would be preferable to have the turbine blades 18 made out of a transparent or substantially transparent material so that light or solar energy can shine through them.

The three turbine blades 18 are equally spaced about the vertical shaft 22 at 120 degree intervals. Variations in design may allow for two to eight turbine blades 18 to be equally spaced about the vertical shaft 22.

In some embodiments of the invention, a circular support 26 is mounted to bottom edges of the turbine blades 18. Additionally, another circular support 26 may also be mounted to the top edges of the turbine blades 18. The circular support(s) 26 aides in stabilizing the plurality of turbine blades 18. Furthermore, the circular support(s) may add to the wind-energy catching ability of the turbine blades 18 by providing sides to a "pocket" formed for trapping moving air and converting the moving air's energy into mechanical rotational movement of the turbine blades 18.

A power pulley 28 is rigidly mounted on and has its center axis aligned with the axis of the vertical shaft 22. The power pulley 28 is positioned either above or below the turbine blades 18. The vertical shaft 22 is rotably mounted with bearings (not specifically shown) to the top 12 and bottom 14 of the support structure. The bearings or other means for allowing rotation are designed to provide a minimal amount of resistance or friction with respect to the rotational turning of the combination of the turbine blades 18 and vertical shaft 22 (herein after called the "turbine body" 30) about the vertical axis thereof.

An electric generator 32, having a generator pulley 34 mounted on the electric generator's input shaft, is positioned so that a belt or band 36 transfers rotational energy from the power pulley 28 to the generator pulley 34. In the exemplary embodiment, the generator pulley 34 to power pulley 28 rotational ratio is about 20 to 1 (20:1). Other rotation ratios other than 20:1 can be used in various embodiments of the invention depending on the specifications of the electric generator being used. Furthermore, other means for transmitting the energy from the turbine body 30 to the input shaft of the generator 32 may also be used. For example gears, a variable transmission, chain and sprockets, spiral gears, or direct drive can be used to transfer the rotational energy of the turbine body 30 to the input shaft of the generator 32.

The generator, when turned, produces electricity and provides the electricity to an electrical conversion and combining circuit 38, which will be discussed in more detail below.

Figure 2:
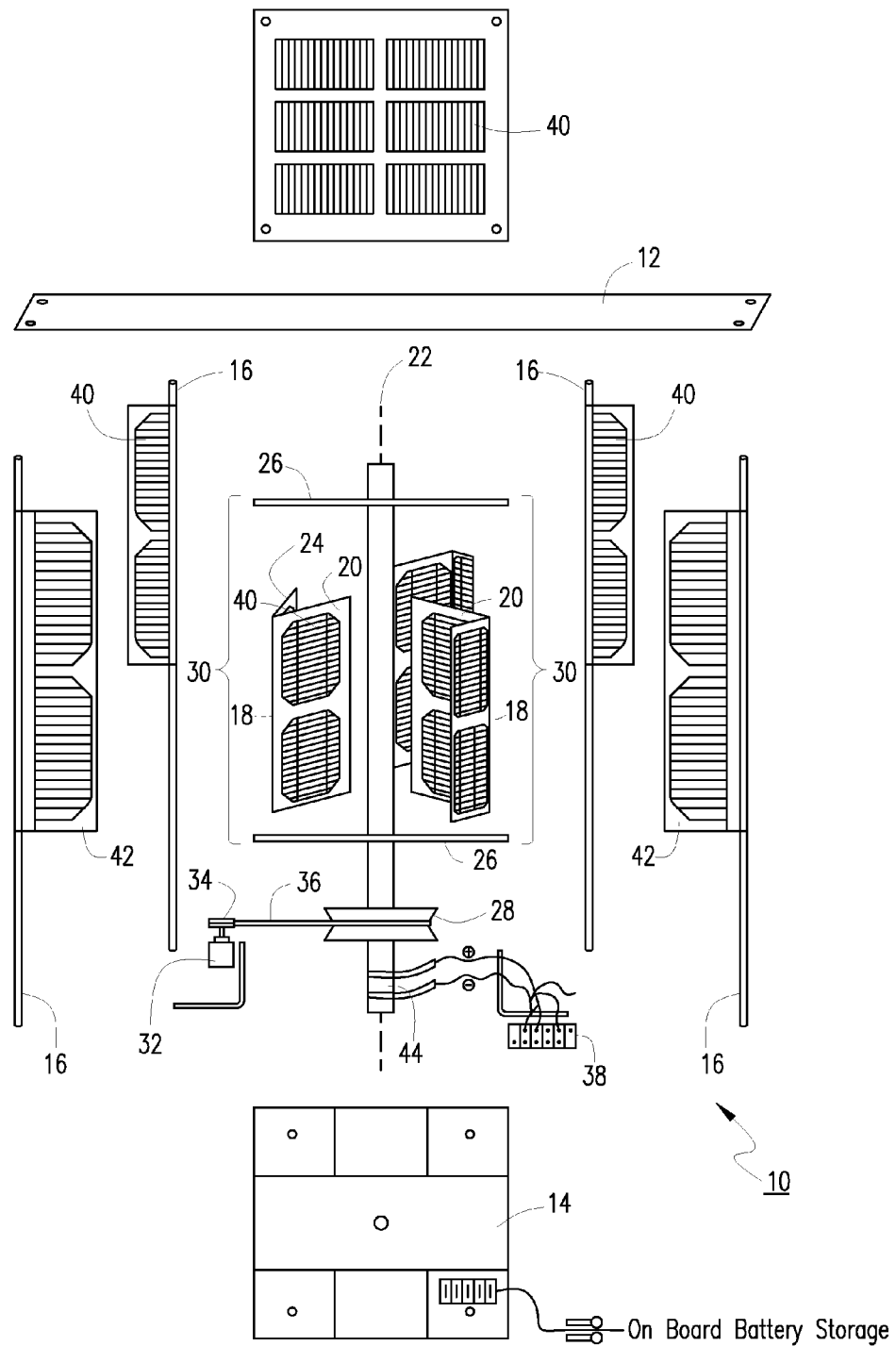
FIG. 2 is a breakaway drawing of exemplary parts that comprise an exemplary solar windmill in accordance with an embodiment of the invention.

Referring now to FIG. 2, a breakaway depiction of various parts in an exemplary solar windmill is shown. The surfaces of the turbine blades 18 are substantially covered with solar panels 40. The upper surface of the top 12 is also substantially covered with solar panels 40. Furthermore, flaps 42, which are attached to the support rods 16 and used to aid in directing wind into the turbine body 30, are also substantially covered with solar panels.

Various types of solar panels may be incorporated into embodiments of the solar windmill 10. Crystalline solar panels are a very efficient type of solar panel that easily absorbs and converts solar energy into electricity. Crystalline solar panels are generally rigid and flat. They are made mostly out of silicon. Another type of solar panel referred to as semi-crystalline solar panels may also be incorporated into embodiments of the invention. Semi-crystalline solar panels are efficient solar panels, but are less efficient than crystalline solar panels. Semi-crystalline panels are also generally rigid and flat. When crystalline or semi-crystalline solar panels are attached to surfaces of the turbine body 30, the flaps 42, and the top surface 12, the surfaces will generally have planar surfaces.

Another type of solar panel is a flexible solar panel. Flexible solar panels, through the advancement of technology, have become quite efficient at converting solar energy into electrical energy, but are not yet as efficient as crystalline solar panels. Regardless, if flexible solar panels are incorporated into an exemplary solar wind turbine, the turbine blades do not have to have a distinct angle between the blade portion 20 and the prong portion 24. The shape of the turbine blade 18 may be curved, scooped or U-shaped, from a top view perspective, rather than a V-shaped turbine blade (see, e.g., FIG. 3). Also the top 12 of the support structure may be, for example, dome, cone, cylindrical, pyramid, box, or other 3-D shape, thereby providing more surface area than a flat surface, and be covered with flexible solar panels on the non-planar portions.

The solar panels 40 affixed to the top 12 and the flaps 42 (the "exterior solar panels") are connected electrically via series and/or parallel electrical connections in order to maximize either the voltage or current produced by these exterior solar panels. The output of the combined exterior solar panels is connected to the an electrical conversion and combining circuit 38.

The solar panels 40 that are affixed to the surfaces of the turbine body 30 are electrically connected in series and/or parallel manner. The output electrical energy created by the turbine body solar panels is provided to a commutator mechanism 44, which transfers the output electrical energy to wires going to the electrical conversion and combining circuit 38.

The electrical conversion and combining circuit 38 receives all the electrical energy created by the generator 32 and the solar panels 40. The electrical conversion and combining circuit 38 converts and combines the input from the solar panels 40 and the generator into a single electrical output 51 from the exemplary solar wind generator 10.

The electrical output 51 from an exemplary solar wind generator may be used to power small appliances, charge batteries, or be combined with the output of other electrical generation devices or systems 53. The dimensions of exemplary solar wind turbines may be small enough so that they can be attached to boats, ships, sailboats, or other locations that often find themselves in sunny and windy conditions. The solar wind turbine can be used on a boat, ship, or sailboat to recharge batteries or aide in powering onboard equipment. Other embodiments may be mounted on the roofs of houses, building, bridges or other stationary structures to produce additional energy for storage in batteries or for immediate use. Golf carts or other similar electrically powered vehicles, such as hybrid automobiles, may also have small detachable or retractable exemplary solar wind turbines attached to them for recharging batteries while the vehicle is not being used. Other embodiments may be mounted on the top of billboards, school warning lights, and other lighting fixtures, including, but not limited to bright LED lighting fixtures in order to charge a battery that provides power to such lighting fixtures or systems. As such, embodiments of the invention may have exterior dimensions that are smaller than 2 feet by 2 feet by 2 feet (2'×2'×2'). It is understood that embodiments of the present invention may also be very large and have dimensions ranging from about a foot on each side to dimensions of 10 to 20 feet on each side. It should also be understood that the dimensions of outer support structure's length, width and height do not have to be equal.

The design of exemplary solar wind turbines is affective for generating energy from both wind and solar energy for a variety of reasons. First, the direction of the wind or airflow, with respect to the sides of the solar wind turbine, does not matter. A north, east, west, south or other wind direction will turn the wind turbine body 30. The wind energy is captured by the turbine blades 18 and the turbine blades are set into a rotational motion. The rotational motion causes the power pulley 28 to rotate the generator pulley 34 and results in energy production by the generator 32. The flaps 42, attached to the support poles 16, scoop and direct additional wind into the turbine body 30.

The solar panels 40 are placed on and about the exemplary solar wind turbine in such a strategic way that at least a plurality of the panels are able to receive solar light energy from the sun regardless of the sun's position in the sky. In additional embodiments of the solar wind turbine, solar reflectors 50 are movably mounted to the support structure. For example they may be movable mounted at the bottom edges of the bottom 14 of the support structure. The solar reflectors 50 have a reflective surface that reflects solar energy toward the solar panels 40 in order to increase the electrical energy production of the solar wind turbine. If the weather becomes overly windy or stormy, the solar reflectors 50 may be moved, either mechanically or electromechanically 46, into a position against the side of the support structure to provide protection against the inclement weather. In some embodiments the electrical energy produced by the solar wind turbine may be used to power an electromechanical mechanism 46 that moves the solar reflectors 50 against the sides of the support structure and back into an open position.

Furthermore, the solar panels 40 may be cooled by the wind or airflow that flows over the solar panels. The cooling of the solar panels 40 by moving air aides in maintaining higher energy conversion efficiency for the solar panels.

An additional advantage of exemplary solar wind turbines is that the turbine body 30 and support structure are very visible to birds and may be referred to as "bird friendly" because birds can see and easily maneuver around an exemplary solar wind turbine. Thus, it is unlikely that a bird will become ingested or injured by an exemplary turbine body 30. Conversely, prior art wind turbines, like the three-bladed propeller style wind turbines and the vertically mounted lollipop style wind turbines are not considered bird friendly because they are difficult for flying birds to see and to judge the movement of the spinning open-air blades. These prior art wind turbines are responsible for the deaths of hundreds of thousands of birds each year, which results in angry cries from animal activists.

As will be recognized by those skilled in the art, the innovative concepts described herein in the embodiments of the solar wind turbine can be modified and varied over a wide range of applications. Accordingly, the scope of patented subject matter should not be limited to any of the specific exemplary teachings discussed, but is instead defined by the following claims.

What is claimed:
1. A solar wind turbine comprising:
   a support structure, said support structure comprising a top, a bottom and at least one support rod extending from the top to the bottom, said top of said support structure is constructed substantially of a substantially rigid transparent material;
   a first solar panel attached to a top surface of said top of the support structure; and
   a turbine body rotably mounted on an axis extending between said top and said bottom, said turbine body comprising:

a plurality of turbine blades extending in a general radial direction from said axis and being equally spaced circumferentially about said axis; and second solar panels mounted on at least one surface of each of said plurality of turbine blades.

2. The solar wind turbine of claim 1, wherein said turbine body is constructed of a substantially rigid transparent material.

3. The solar wind turbine of claim 1, further comprising a flap attached to said support rod, said flap comprising a solar panel mounted thereon, said flap further being positioned such that said flap will be struck by solar energy and such that wind is directed into said turbine body.

4. The solar wind turbine of claim 1, further comprising a solar reflector moveably attached to said support structure and adjustably positionable to reflect solar energy toward said support structure and said turbine body.

5. The solar wind turbine of claim 4, further comprising an electromechanical mechanism that positions said solar reflector vertically against a side of said solar wind turbine.

6. The solar wind turbine of claim 1, further comprising a generator that is movably linked to said turbine body such that rotational movement of said turbine body about said axis causes said generator to produce electrical energy.

7. The solar wind turbine of claim 6, further comprising an electrical circuit that receives and combines electrical energy from said first solar panel, said second solar panels and said generator, said electrical circuit providing a combined electrical output.

8. The solar wind turbine of claim 1, wherein each of said plurality of turbine blades comprises:

a first portion that is flat and extends radially from said axis, and a second portion that is flat and extends at a predetermined angle from said first portion.

9. A solar wind turbine comprising:

an outer support structure, said outer support structure comprising:

a base at the bottom of said outer support structure, a top panel, said top panel being substantially transparent and allowing solar energy to pass through said top panel; and a plurality of support members substantially about a perimeter of said base and extending from said base to a perimeter of said top panel;

a flap being movably attached to and extending radially from one of said plurality of support members, said flap positioned to direct an air flow into an interior of said outer support structure;

a turbine body having fins, each fin having a first fin width portion that first extends radially from a vertical axis, said vertical axis being centrally located in said interior of said outer support structure and extending from said base to said top panel, and a second fin width portion that extends at a predetermined angle from said first fin portion, each fin further having a height that is less than a distance between said top panel and said base; said turbine body being rotatably mounted so that said fins rotate about said vertical axis a first solar panel mounted on a top surface of said top portion;

a second solar panel mounted on a surface of said flap; and a set of solar panels mounted such that at least one solar panel is on each one of said fins.

10. The solar wind turbine of claim 9, wherein said fins are substantially transparent so that solar energy can pass through said fins.

11. The solar wind turbine of claim 9, further comprising a solar reflector movably mounted on said outer support structure and being mechanically positionable to reflect solar energy toward said second solar panel and said set of solar panels.

12. The solar wind turbine of claim 9, further comprising a generator positioned in mechanical communication with said turbine body such that energy associated with mechanical rotations of said turbine body about said axis are transferred to said generator and result in a conversion to electrical energy, said electrical energy being provided as a generator output.

13. The solar wind turbine of claim 12, wherein said first solar panel, said second solar panel and said set of solar panels each produce electricity when solar energy impinges thereon; said electricity being combined with said generator output to provide a solar wind turbine output.

14. The solar wind turbine of claim 13, wherein said solar wind turbine output is used to charge a battery.

15. The solar wind turbine of claim 9, wherein said solar wind turbine is bird friendly.

16. The solar wind turbine of claim 9 wherein said support structure has dimensions that are equal to or smaller than 2 feet by 2 feet by 2 feet.

* * * * *